(12) United States Patent
Zoescher et al.

(10) Patent No.: US 10,992,504 B2
(45) Date of Patent: Apr. 27, 2021

(54) ACTIVE LOAD MODULATION TRANSCEIVER

(71) Applicant: NXP B.V., Eindhoven (NL)

(72) Inventors: Lukas Zoescher, Graz (AT); Erich Merlin, Gratkorn (AT); Ulrich Andreas Muehlmann, Graz (AT)

(73) Assignee: NXP B.V., Eindhoven (NL)

( * ) Notice: Subject to any disclaimer, the term of this patent is extended or adjusted under 35 U.S.C. 154(b) by 0 days.

(21) Appl. No.: 16/246,297

(22) Filed: Jan. 11, 2019

(65) Prior Publication Data
US 2019/0215203 A1 Jul. 11, 2019

(30) Foreign Application Priority Data
Jan. 11, 2018 (EP) .................................... 18151257

(51) Int. Cl.
*H04L 27/20* (2006.01)
*H04L 7/02* (2006.01)
(Continued)

(52) U.S. Cl.
CPC ............. *H04L 27/20* (2013.01); *H04B 1/38* (2013.01); *H04B 5/0031* (2013.01); *H04B 5/0062* (2013.01); *H04L 7/02* (2013.01)

(58) Field of Classification Search
CPC . G06K 7/00; G06K 7/10; G06K 19/07; H03L 7/20; H03L 7/081; H03L 7/083; H04B 1/04; H04B 1/38; H04B 1/59; H04B 5/00; H04B 17/00; H04B 17/21; H04L 7/00; H04L 7/02; H04L 27/04; H04L 27/20; H04L 27/033; H04L 27/148; H04W 4/00; H04W 4/80; H04W 56/00; H04W 88/06
(Continued)

(56) References Cited

U.S. PATENT DOCUMENTS 8,838,023 B2 9/2014 Charrat et al.
9,513,609 B2 12/2016 Thueringer et al.
(Continued)

FOREIGN PATENT DOCUMENTS

| EP | 2 824 612 A1 | 1/2015 |
| EP | 3 121 755 A1 | 1/2017 |
| EP | 3 145 092 A1 | 3/2017 |

OTHER PUBLICATIONS

Extended European Search Report for Patent Appln. No. 18151257.5 (dated Jul. 3, 2018).
(Continued)

*Primary Examiner* — Shawkat M Ali

(57) ABSTRACT

In accordance with a first aspect of the present disclosure, an active load modulation (ALM) transceiver is provided, comprising a transmitter configured to send a transmit signal to an external device, wherein the transceiver is configured to adjust one or more parameters of the transmit signal at the end of at least one burst of said transmit signal. In accordance with a second aspect of the present disclosure, a method of operating an active load modulation (ALM) transceiver is conceived, comprising sending, by a transmitter of the transceiver, a transmit signal to an external device, and adjusting, by the transceiver, one or more parameters of the transmit signal at the end of at least one burst of said transmit signal.

14 Claims, 9 Drawing Sheets

(51) Int. Cl.
*H04B 1/38* (2015.01)
*H04B 5/00* (2006.01)

(58) Field of Classification Search
USPC .......................... 375/219, 259, 268, 295, 316
See application file for complete search history.

(56) References Cited

U.S. PATENT DOCUMENTS

| | | |
|---|---|---|
| 9,577,718 B2* | 2/2017 | Gaethke ............... H04B 5/0093 |
| 9,985,732 B2* | 5/2018 | Cordier ............... G06K 7/10237 |
| 2014/0003548 A1* | 1/2014 | Lefley .................. H04B 5/0075 |
| | | 375/268 |
| 2016/0371580 A1 | 12/2016 | Kunc et al. |
| 2017/0198571 A1* | 7/2017 | Chimakurthy .......... E21B 49/00 |
| 2018/0006801 A1* | 1/2018 | Hung ............... H04N 21/25808 |
| 2019/0036568 A1* | 1/2019 | Kovacic ............. G06K 7/10366 |

OTHER PUBLICATIONS

Stark, M. et al. "How to guarantee Phase-Synchronicity in Active Load Modulation for NFC and Proximity", IEEE 2013 5th International Workshop on Near Field Communication, 6 pgs. (Feb. 2013).

\* cited by examiner

ACTIVE LOAD MODULATION TRANSCEIVER

CROSS-REFERENCE TO RELATED APPLICATIONS

This application claims the priority under 35 U.S.C. § 119 of European patent application no. 18151257.5, filed on Jan. 11, 2018, the contents of which are incorporated by reference herein.

OVERVIEW

The present disclosure relates to an active load modulation (ALM) transceiver and to a method of operating an ALM transceiver. An ALM transceiver typically generates and drives an antenna signal that emulates the load modulation of a passive high-frequency radio frequency identification (RFID) transponder with respect to an RFID reader device. Active transponders maintain a local clock to generate a transmit signal that is synchronous to the carrier signal emitted by the reader device. The phase error between the local clock and the reader carrier signal should be limited to allow a correct signal demodulation by the reader.

SUMMARY

In accordance with a first aspect of the present disclosure, an active load modulation (ALM) transceiver is provided, comprising a transmitter configured to send a transmit signal to an external device, wherein the transceiver is configured to adjust one or more parameters of the transmit signal at the end of at least one burst of said transmit signal.

In an embodiment, the parameters comprise a phase of the transmit signal and/or a pulse width of the transmit signal.

In an embodiment, the transceiver is configured to adjust said parameters using preconfigured parameter settings.

In an embodiment, the transceiver further comprises a controller that is configured to monitor one or more system characteristics and to adjust the parameters in dependence on said system characteristics.

In an embodiment, the system characteristics comprise a settling of the transmit signal on an antenna of the transceiver.

In an embodiment, the system characteristics comprise a phase error of a local clock signal with respect to a signal received from the external device.

In an embodiment, the transceiver further comprises a receiver and at least one adjustable resistance coupled to input or output terminals of the transmitter and to input or output terminals of the receiver.

In an embodiment, the transceiver further comprises a controller configured to adjust said adjustable resistance.

In an embodiment, the adjustable resistance comprises at least one active device, and the controller is configured to adjust the adjustable resistance by applying an analog control signal to said active device.

In an embodiment, the adjustable resistance comprises passive resistance elements, and the controller is configured to adjust the adjustable resistance by digitally switching said passive resistance elements.

In an embodiment, the input or output terminals of the transmitter and the input or output terminals of the receiver are the same terminals.

In an embodiment, the input or output terminals of the transmitter and the input or output terminals of the receiver are separate terminals, a first adjustable resistance is coupled to the input or output terminals of the transmitter, and a second adjustable resistance is coupled to the input or output terminals of the receiver.

In an embodiment, the transceiver further comprises a coupling network between the transmitter and an antenna of the transceiver, wherein said coupling network comprises a plurality of capacitors for implementing an impedance optimization between the antenna and input or output terminals of the transmitter.

In an embodiment, a radio frequency identification (RFID) transponder comprises a transceiver of the kind set forth.

In accordance with a second aspect of the present disclosure, a method of operating an active load modulation (ALM) transceiver is conceived, comprising sending, by a transmitter of the transceiver, a transmit signal to an external device, and adjusting, by the transceiver, one or more parameters of the transmit signal at the end of at least one burst of said transmit signal.

DESCRIPTION OF DRAWINGS

Embodiments will be described in more detail with reference to the appended drawings, in which.

DESCRIPTION OF EMBODIMENTS

An ALM transceiver typically generates and drives an antenna signal that emulates the load modulation of a passive high-frequency radio frequency identification (RFID) transponder with respect to an RFID reader device. Active transponders maintain a local clock to generate a transmit signal that is synchronous to the carrier signal emitted by the reader device. The phase error between the local clock and the reader carrier signal should be limited to allow a correct signal demodulation by the reader. The local clock of an active transponder typically can only by resynchronized to the carrier signal of the reader in time periods when the ALM transceiver is not active, for example during modulation pauses of the transmit signal. The transient settling of the signal at the antenna following a transmitted signal burst may however mask the reader signal, and thus prevent, or at least significantly reduce, the available time for the resynchronization. This effect is in particular relevant regarding antenna circuits with a high quality factor (Q) and modulation schemes with short modulation pauses, as applied for achieving higher data rates (e.g., for transponders compatible with the ISO/IEC 14443 Type B standard). Using an antenna circuit with a higher Q factor is nevertheless desirable to improve the power efficiency of the ALM transceiver. It may be desirable to improve an ALM transceiver of the kind set forth, so as to achieve a more effective resynchronization to a carrier signal while minimizing negative effects on the power efficiency of the ALM transceiver.

Therefore, in accordance with a first aspect of the present disclosure, an ALM transceiver is provided, comprising a transmitter configured to send a transmit signal to an external device (e.g., a reader device), wherein the transceiver is configured to adjust one or more parameters of the transmit signal at the end of at least one burst of said transmit signal. Thereby, the settling of the transmit signal at the antenna following a transmission burst of the ALM transceiver may be accelerated, which in turn enables a resynchronization of the local clock to the carrier signal of the reader device within short modulation pauses and for high-Q transponder antenna circuits. Accordingly, the presently disclosed ALM transceiver may have a high transmitter power efficiency and support high transmission data rates. In an embodiment, the parameters comprise the phase of the transmit signal and/or the pulse width of the transmit signal. These parameters are particularly suitable for influencing the settling time of the transmit signal at the antenna.

Figure 1A:
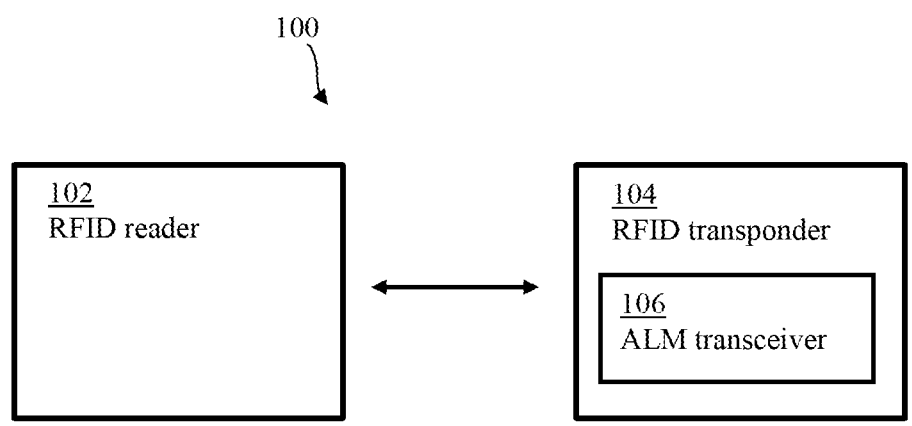
FIG. 1A shows an illustrative embodiment of an RFID system.

FIG. 1A shows illustrative embodiment of an RFID system 100. The RFID system comprises an RFID reader 102 and an RFID transponder 104. In operation, the RFID reader 102 may transmit a carrier signal to the RFID transponder 104. Then, the RFID transponder 104 may modulate this carrier signal using active load modulation (ALM). For this purpose, the RFID transponder 104 comprises an ALM transceiver 106 of the kind set forth. As mentioned above, in accordance with the present disclosure, the ALM transceiver 106 is configured to adjust one or more parameters of a transmit signal at the end of at least one burst of said transmit signal.

More specifically, the ALM transceiver 106 is configured to adjust the parameters of the transmit signal at the end of a transmitted signal burst to achieve a faster settling of the signal at an antenna of the RFID transponder 104. For example, the ALM transceiver 106 may reverse the phase of the transmit signal, i.e. shift the phase by 180°, for a defined period ahead of the end of a transmit signal burst to achieve a faster decay of the antenna signal. Subsequently, as will be explained in more detail below, the ALM transceiver 106 may adjust the input resistance at its receiver (RX) and/or the transmitter (TX) terminals to effectively adapt the quality factor or other characteristics of the antenna circuit, thereby allowing a fast recovery of the carrier signal at the receiver.

Figure 1B:
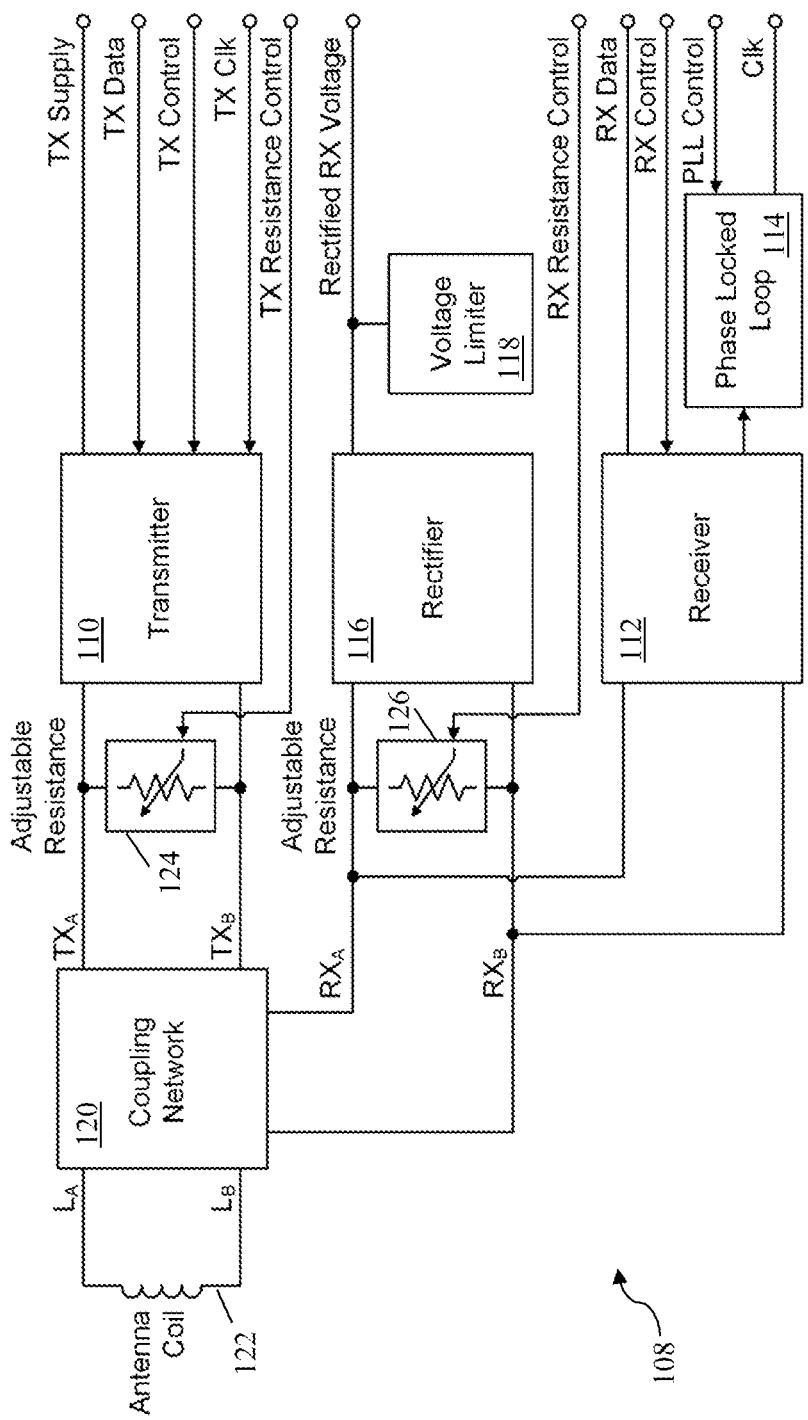
FIG. 1B shows an illustrative embodiment of an ALM transceiver.

FIG. 1B shows an illustrative embodiment of an ALM transceiver 108. In particular, FIG. 1B shows a block diagram of an embodiment of a differential ALM transceiver 108. The ALM transceiver 108 includes a transmitter 110 and a receiver 112 circuit that are connected to an antenna coil 122 via a coupling network 120. The transmitter 110 may actively drive a signal at the terminals $TX_A$ and $TX_B$ that emulates the load modulation of a passive RFID device. Furthermore, the transmitter 110 may be put into an inactive state, in which it provides a high input resistance towards $TX_A$ and $TX_B$. In operation, the receiver circuit 112 amplifies and demodulates a carrier signal that is emitted by an RFID reader device (not shown) and received at the antenna coil 122. The receiver 112 may optionally also observe the signal at the antenna when the transmitter 110 is active. In addition, the receiver 112 forwards the received and amplified carrier signal of the reader device to a phase locked loop (PLL) 114 or an alternative means to synchronize the frequency and/or the phase of a local clock signal (Clk). The PLL 114 may be configured to be in a tracking or an open-loop mode. In the tracking mode the frequency and phase of the received signal are observed and the local clock signal is synchronized accordingly. In the open-loop mode the current clock frequency is maintained independently of the signal forwarded by the receiver 112. Typically, the clock signal is subject to a drift of the frequency and the phase during the open-loop mode and therefore a periodic resynchronization is necessary in order to limit the phase error with respect to the carrier signal of the reader device.

The ALM transceiver 108 additionally includes adjustable resistances 124, 126 that are connected to the receiver ($RX_A$, $RX_B$) and transmitter terminals ($TX_A$, $TX_B$). In a practical and efficient implementation, the effective resistance of the adjustable resistance blocks 124, 126 may be controlled by a controller (not shown) using resistance control signals. More specifically, in a practical and efficient implementation, the effective resistance of the adjustable resistance blocks 124, 126 may be controlled by applying an analog control signal to an active device, such as a transistor, or by digitally switching passive resistance elements. In addition, a rectifier circuit 116 may be connected to the receiver terminals $RX_A$ and $RX_B$, which allows to rectify the received signal. The rectified output voltage may be regulated or rather limited by a voltage limiter circuit 118. As mentioned above, the adjustable resistances 124, 126 facilitate adapting the quality factor or other characteristics of the antenna circuit, thereby allowing a fast recovery of the carrier signal at the receiver 112. In the example shown in FIG. 1, the input/output terminals $TX_A$, $TX_B$ of the transmitter 110 and the input/output terminals $RX_A$, $RX_B$ of the receiver 112 are separate terminals, and a first adjustable resistance 124 is coupled to the input/output terminals $TX_A$, $TX_B$ of the transmitter 110, and a second adjustable resistance 126 is coupled to the input/output terminals $RX_A$, $RX_B$ of the receiver 112. In this way, the effective parameters of the antenna circuit can be adjusted in a flexible manner. For instance, parameters like the quality factor, the input impedance or the resonance frequency of the antenna network may be adjusted to improve the power efficiency of the transmitter 110 or the sensitivity of the circuit towards the received signal strength.

Figure 2:
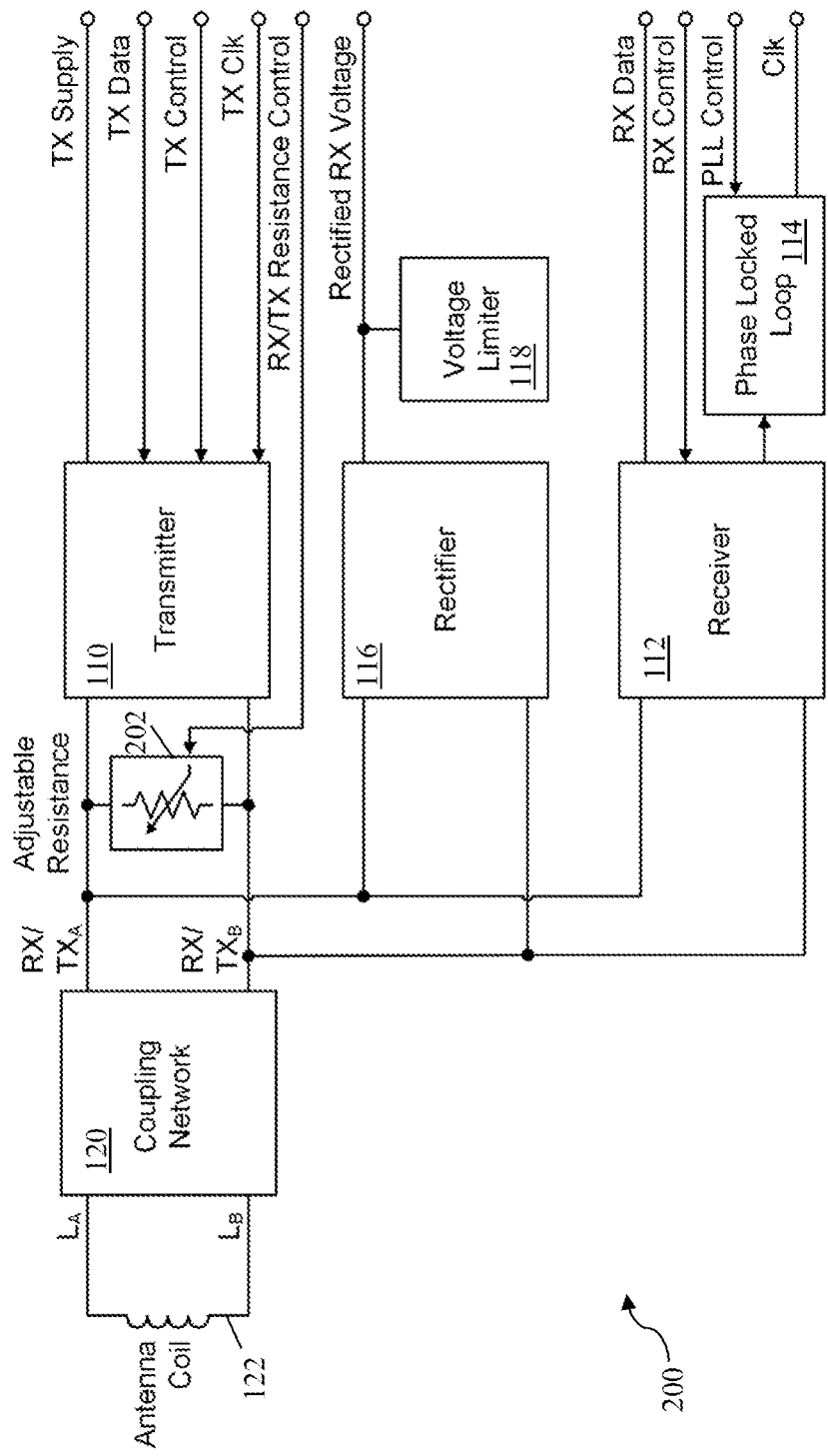
FIG. 2 shows another illustrative embodiment of an ALM transceiver.

FIG. 2 shows another illustrative embodiment of an ALM transceiver 200. In particular, FIG. 2 shows a block diagram of another embodiment of an ALM transceiver 200. The ALM transceiver 200 and the included circuit blocks 110, 112, 114, 116, 118 are functionally identical to the circuit blocks shown in FIG. 1B. In contrast to the ALM transceiver 108 shown in FIG. 1B, the receiver 112 and transmitter 110 are connected to the same input/output (I/O) terminals $RX/TX_A$ and $RX/TX_B$. This embodiment of the ALM transceiver 200 includes accordingly only a single adjustable resistance block 202. The circuit structure of FIG. 2 allows to simplify the antenna coupling network and possibly also to reduce the chip area of an integrated transceiver implementation, which in turn may result in lower fabrication costs.

Figure 3:
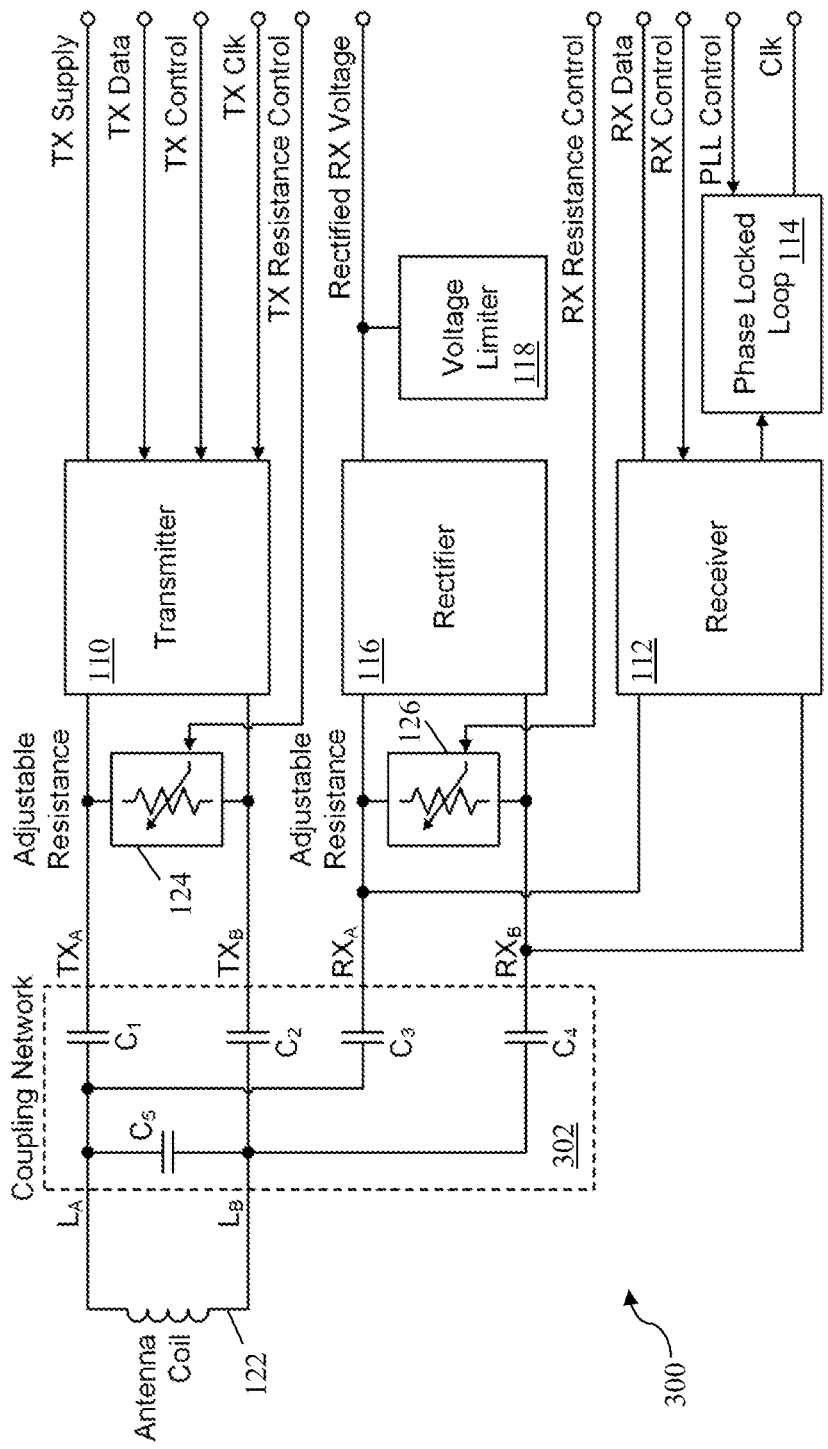
FIG. 3 shows a further illustrative embodiment of an ALM transceiver.

FIG. 3 shows a further illustrative embodiment of an ALM transceiver 300. In particular. FIG. 3 shows an embodiment of a coupling network 302 between the antenna coil 122 and the I/O terminals $TX_A$, $TX_B$, $RX_A$, $RX_B$, of an ALM transceiver 300. The values of the capacitors $C_1$-$C_5$ may be chosen, for example, in such a way that an impedance optimization is achieved between the antenna and the I/O terminals $TX_A$, $TX_B$, so as to enhance the power efficiency of the transmitter 110 or to increase the signal power at the antenna 122 for a given set of transmitter parameters. For example, the impedance optimization may comprise resonance matching or impedance matching. Furthermore, the capacitor values may be designed to achieve a parallel resonance at the antenna 122 in the RX (receiver) operating mode with a resonance frequency that is close to the carrier frequency of the reader, and thus allow to receive reader signals with a lower field strength. Changing the resistance at the transmitter and receiver I/O terminals in addition allows to adjust the effective parameters of the antenna circuit. This is predominately valid with respect to the quality factor of the antenna circuit, but also the parallel resonance frequency observed at the antenna may be shifted.

In an embodiment, the ALM transceiver is configured to adjust the transmit signal parameters using preconfigured parameter settings. In other words, the parameters settings for an active damping phase (i.e. active damping at the end of a transmit signal burst) may be configured statically by design. In this way, no resources are required for dynamically controlling the parameter adjustment. For example, the TX/RX parameters may be loaded from a non-volatile memory into a configuration register at power-up or after a reset. The RX/TX operation, including the active damping phase, and the clock resynchronization the signal timing) may be controlled by a relatively simple digital state machine for static parameter settings. The configuration parameters may be determined and programmed, for example, once during the verification phase of a device, taking into account characteristics of the used antenna, such as the device casing and the specific coupling network.

Alternatively or in addition, in an embodiment, the ALM transceiver comprises a controller that is configured to monitor one or more system characteristics and to adjust the parameters in dependence on said system characteristics. In other words, the parameters may be adapted or optimized continuously during the operation of the ALM transceiver by means of a controller that monitors specific system characteristics. In this way, the parameter adjustment can be performed in a flexible manner. In a practical and efficient implementation, the system characteristics comprise the settling of the transmit signal on an antenna of the transceiver. For example, an ALM transceiver may obverse the settling of the antenna signal after a transmission burst using its receiver circuit and increase or decrease the duration of the active damping phase or another parameter so as to minimize the settling time. In another practical and efficient implementation, the system characteristics comprise a phase error of a local clock signal with respect to a signal received from the external device (i.e., the reader). For instance, the ALM transceiver may evaluate the progression of the phase error of the local clock signal with respect to the reader signal during the resynchronization state following a transmission pulse. Observing the output power of the transmitter during the active damping phase furthermore allows to conclude on the signal conditions at the antenna.

Figure 4A:
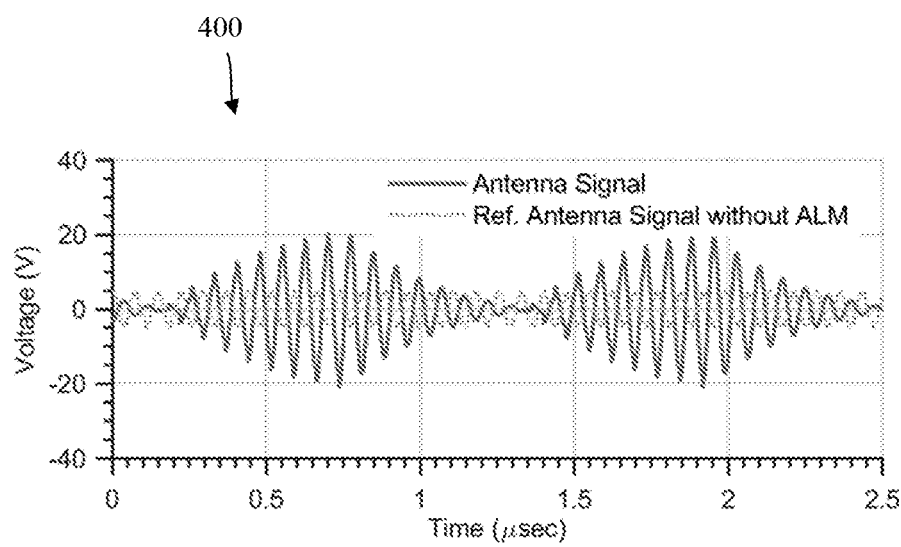
FIG. 4A shows an example of a signal observed at an antenna of an ALM transceiver.

FIG. 4A shows an example of a signal 400 observed at an antenna of an ALM transceiver. More specifically, FIG. 4A shows a differential signal 400 observed at the antenna of a typical ALM transponder circuit. The dotted line corresponds to the reader or reference (Ref.) carrier signal that is received at the antenna, if no ALM is applied.

Figure 4B:
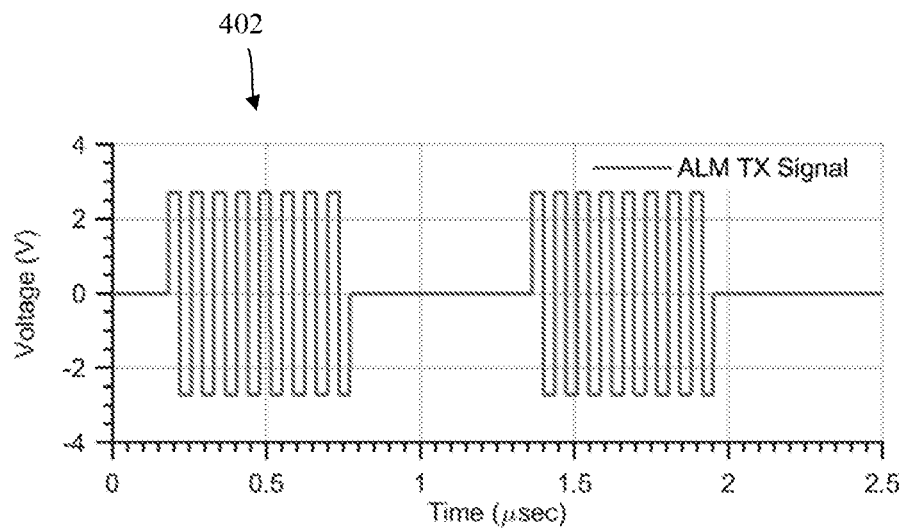
FIG. 4B shows an example of a signal observed at a transmitter output of an ALM transceiver.

FIG. 4B shows an example of a signal 402 observed at a transmitter output of an ALM transceiver. More specifically, FIG. 4B shows a differential signal 402 observed at the transmitter output of a typical ALM transceiver.

The settling behavior or the decay of the signal 400 at the antenna following a transmission burst is dependent on the quality factor (Q) of the antenna circuit that may comprise the antenna coil, the coupling network and virtually the input impedances observed at the connected I/O terminals of the transceiver circuit (e.g., see FIG. 3). Increasing the Q of the antenna circuit, for a specific coupling network topology, causes a decrease of the bandwidth and thus a retardation of the settling time of the antenna signal. FIG. 4A shows an example of the signal 400 at an antenna with a high effective quality factor (Q~20), as observed during the transmitter operation of a typical ALM transceiver. This transceiver circuit does not apply any measures to damp or counteract the antenna signal following a transmission burst. FIG. 4B illustrates the corresponding transmitter output signal 402. As shown in FIG. 4A, the signal at the antenna does not settle during a modulation pause, and the reader signal remains masked by the transmitter signal. A resynchronization of the local clock to the reader carrier signal during the modulation pause is thus not possible. The required bandwidth of the antenna circuit is first defined by the characteristics of the targeted transmission waveforms. Allowing additionally a carrier resynchronization during the modulation pauses of the transmit signal, as noted, demands to increase the bandwidth, which typically requires to lower the quality factor. A reduction of Q may be accomplished by adding an additional resistance in series or parallel to the antenna, or by adjusting the input resistance of the connected I/O terminals of the transceiver, as mentioned previously. Nevertheless, lowering Q inevitably causes a decrease of the power efficiency of the ALM transmitter sub-system.

Figure 5A:
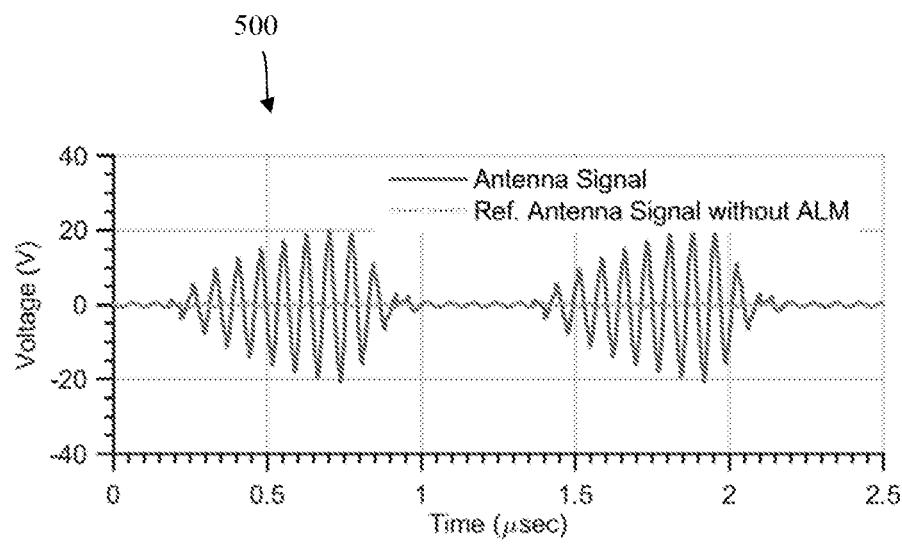
FIG. 5A shows an illustrative embodiment of a signal observed at an antenna of an ALM transceiver.

FIG. 5A shows an illustrative embodiment of a signal 500 observed at an antenna of an ALM transceiver. More specifically, FIG. 5A shows a differential signal 500 observed at the antenna, between nodes $L_A$ and $L_B$ in FIG. 1B. The dotted line corresponds to the reader or reference (Ref.) signal that is received at the antenna, if no ALM is applied.

Figure 5B:
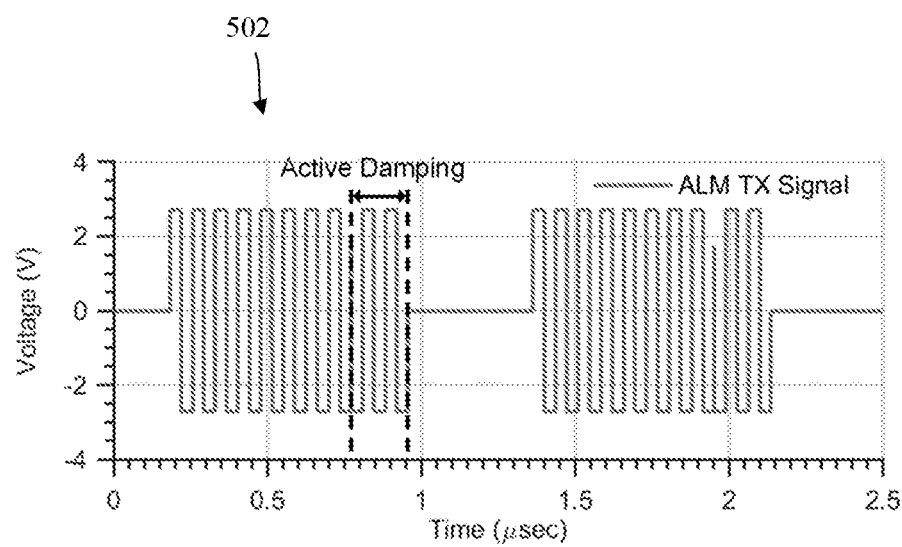
FIG. 5B shows an illustrative embodiment of a signal observed at a transmitter output of an ALM transceiver.

FIG. 5B shows an illustrative embodiment of a signal 502 observed at a transmitter output of an ALM transceiver. More specifically, FIG. 5B shows a differential signal 502 observed at the transmitter output, between nodes TXA and TXB in FIG. 1B. The parameters of the transmit signal at the end of a transmission burst are adjusted to actively damp the transmit signal at the antenna and thus facilitate the signal settling.

In particular, FIG. 5A and FIG. 5B show embodiments of signal waveforms at the antenna and the TX terminals of an ALM transceiver in accordance with the present disclosure. As indicated, the transceiver adjusts the transmit signal parameters for a certain amount of time at the end of a transmission burst in order to achieve a faster decay of the transmit signal at the antenna. In the shown example, the transmitter shifts the phase of the transmit signal by 180° at the end of the transmission burst to counteract and thus actively damp the antenna signal. As shown in FIG. 5A, applying the phase-reversed signal causes a rapid decline of the antenna signal. Eventually, the direction of the power flow at the transmitter is reversed for this amount of time, and energy is fed back to the power supply of the transmitter, which improves the power efficiency of the transceiver.

Figure 5C:
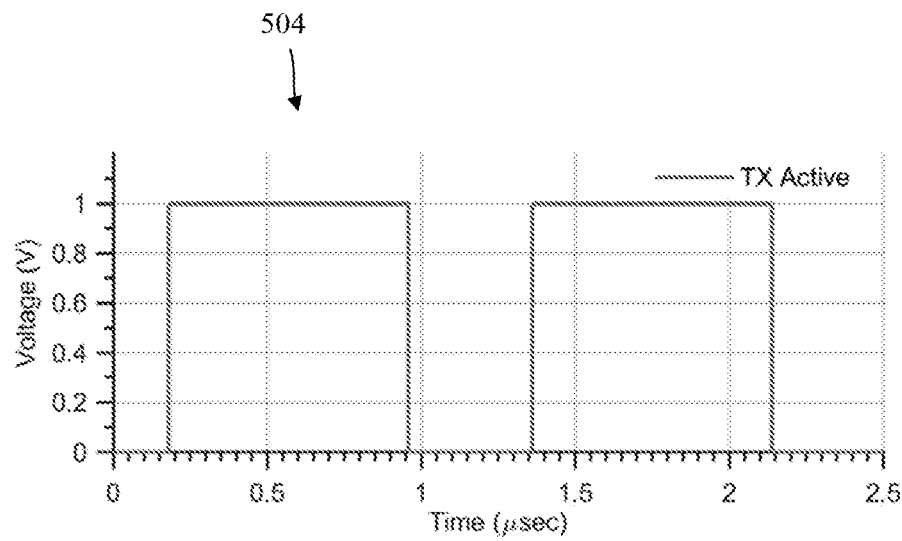
FIG. 5C shows an illustrative embodiment of a control signal for an active transmitter state of an ALM transceiver.

FIG. 5C shows an illustrative embodiment of a control signal 504 for an active transmitter state of an ALM transceiver. More specifically, FIG. 5C shows a control signal 504 for the active transmitter state of the ALM transceiver. In this state the input resistance at the RX and TX terminals equals $R_{Rx,1}$ and $R_{TX,1}$, respectively, and the PLL operates in the open-loop mode.

Figure 5D:
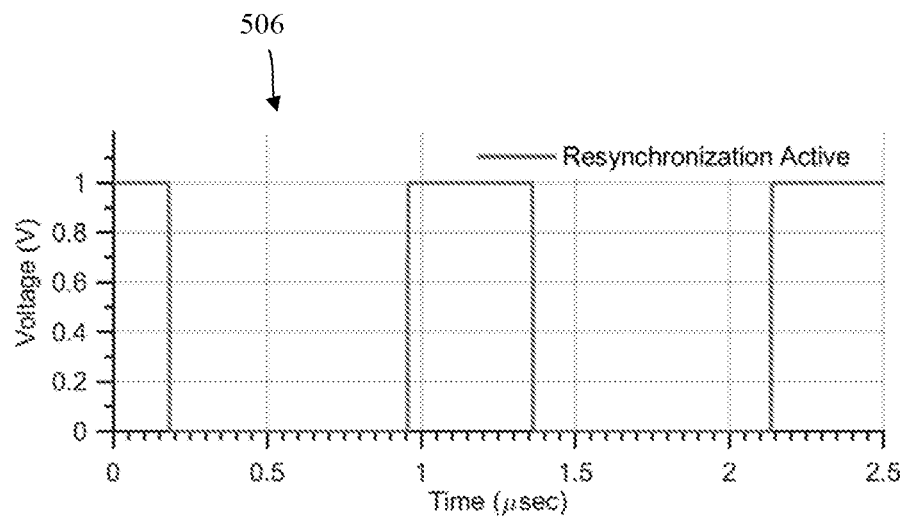
FIG. 5D shows an illustrative embodiment of a control signal for a resynchronization state of an ALM transceiver.

FIG. 5D shows an illustrative embodiment of a control signal 506 for a resynchronization state of an ALM transceiver. More specifically, FIG. 5D shows a control signal 506 for the resynchronization state of the ALM transceiver. In this state the PLL is configured to operate in the tracking mode and the input resistance at the RX and TX terminals is adjusted to the values $R_{RX,2}$ and $R_{TX,2}$, respectively.

In particular, FIG. 5C and FIG. 5D show examples of signals for controlling the operating states of an ALM transceiver in accordance with the present disclosure. During the period when the transmitter is active, as shown in FIG. 5C, the input resistance at the transmitter and the receiver terminals equals $R_{RX,1}$ and $R_{TX,1}$, respectively. $R_{TX,1}$ is predominately defined by the output resistance of the transmitter circuit, which is typically very low to achieve a high power efficiency. The adjustable resistance that is connected at the TX terminals, as shown in FIG. 1, provides in contrast a high input resistance in this operating state. $R_{RX,1}$ may be adjusted to obtain a specific Q factor for the antenna circuit. Considering a coupling network as shown in FIG. 3, $R_{RX,1}$ is typically set to a low value in order to achieve a high quality factor.

Following the active transmitter operation, the transceiver transitions to the resynchronization state, as shown in FIG. 5D. The input resistance at the transmitter and the receiver I/O terminals are adjusted to the values $R_{RX,2}$ and $R_{TX,2}$, respectively. The transmitter circuit shows a high input impedance in this state and $R_{TX,2}$ is defined by the associated adjustable resistance circuit. In particular, $R_{TX,2}$ is most commonly adjusted to a higher value than $R_{TX,1}$ in order to lower the quality factor of the antenna circuit, and thus enforce a fast settling of the antenna signal. Furthermore, $R_{RX,2}$ may be set to a value that is larger than $R_{RX,1}$ to further reduce Q and increase the signal amplitude at the receiver terminals. As shown in FIG. 5A, the adjustment of the input resistance at the transmitter and the receiver I/O terminals results in a fast settling of the residual transmit signal at the antenna and a fast recovery of the carrier signal from the reader. Subsequently, the PLL is configured to operate in the tracking mode, and the local clock signal is resynchronized to the received carrier signal. The activation of the tracking mode may be delayed by a specific amount of time for preventing an unintended skewing of the PLL output phase and the frequency at the onset of the resynchronization state due to transient effects.

Figure 6A:
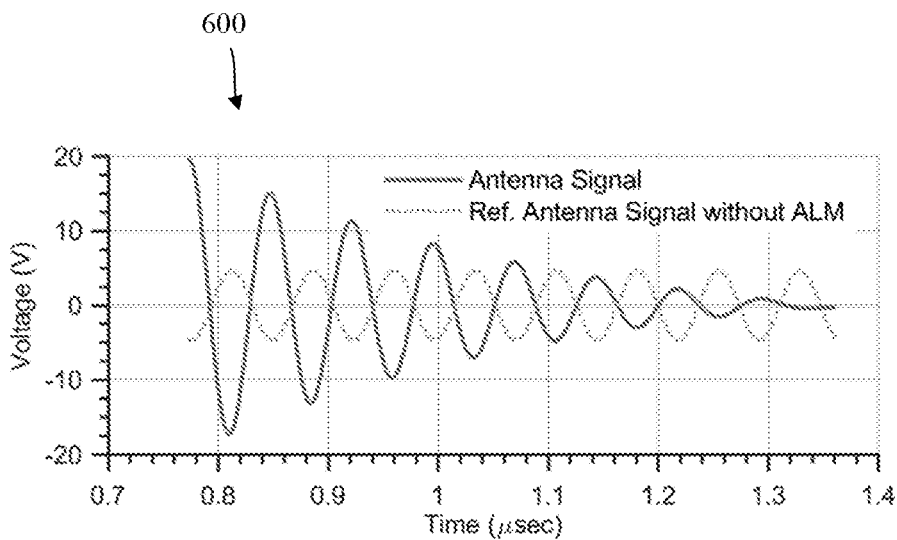
FIG. 6A shows another example of a signal observed at an antenna of an ALM transceiver.

FIG. 6A shows another example of a signal 600 observed at an antenna of an ALM transceiver. More specifically, FIG. 6A shows a magnification of the signals shown in FIG. 4A in the period between two transmission bursts.

Figure 6B:
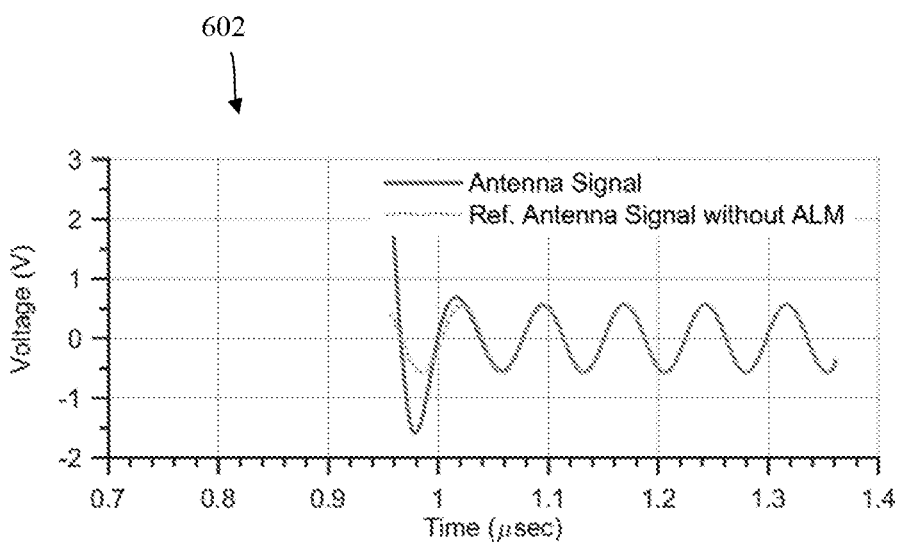
FIG. 6B shows another illustrative embodiment of a signal observed at an antenna of an ALM transceiver.

FIG. 6B shows another illustrative embodiment of a signal 602 observed at an antenna of an ALM transceiver. More specifically, FIG. 6B shows a magnification of the signals shown in FIG. 5a in the period between two transmission bursts.

In particular, FIG. 6A and FIG. 6B show a comparison of the signals observed at the antenna of a typical ALM transponder and at the antenna of the presently disclosed ALM transponder. The dotted line corresponds to the reader or reference (Ref.) signal that is received at the antenna, if no ALM is applied. As shown, the presently disclosed ALM transponder enforces a fast settling of the antenna signal, and thus enables to resynchronize the local clock to the reader carrier signal. As can be seen, the antenna signal in FIG. 6B quickly approaches the received carrier signal of the reader, allowing a resynchronization of the local clock. The amplitude of the received carrier signal in FIG. 6B is nevertheless considerably lower than for the signal in FIG. 6A due to the reduced quality factor in the resynchronization state.

Figure 7:
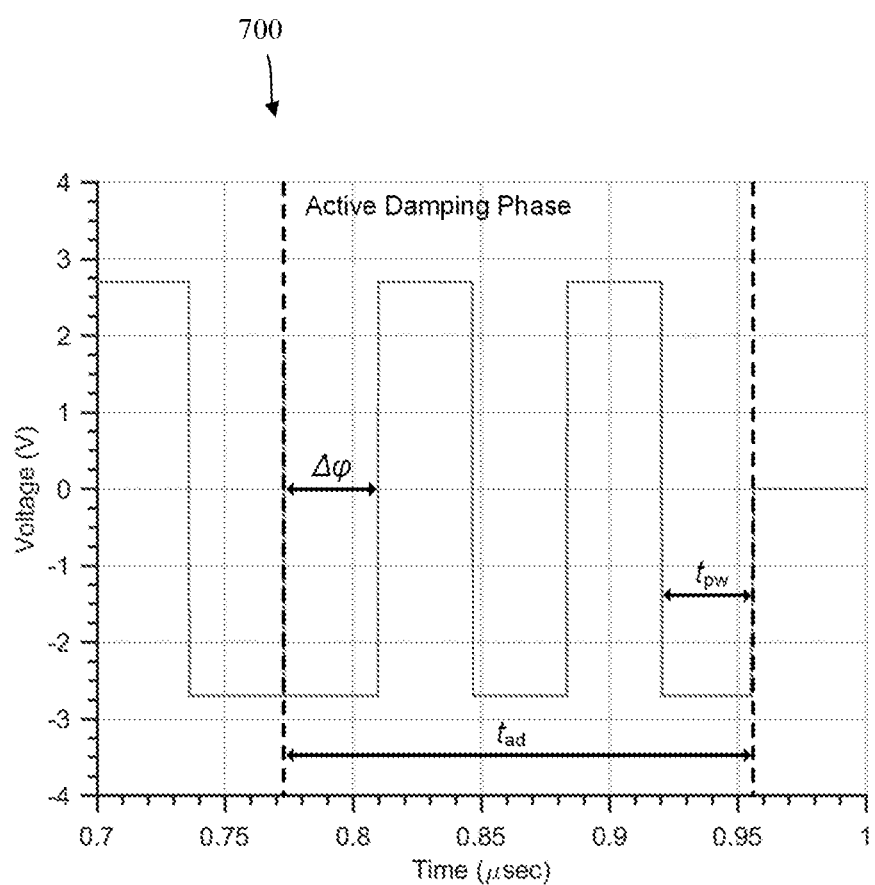
FIG. 7 shows an illustrative embodiment of adjustable transmit signal parameters.

FIG. 7 shows an illustrative embodiment of adjustable transmit signal parameters 700. More specifically, FIG. 7 illustrates examples of the parameters of the transmit signal that may be adjusted to actively damp the signal at the antenna and thus facilitate the settling behavior subsequently to a transmission burst. As shown, the phase $\Delta\varphi$ or the pulse width $t_{pw}$ of the transmit signal may be adjusted. The parameters may be changed continuously, one or multiple times within a period tad at the end of a transmission burst. Alternatively, the changes may be applied statically during the period tad. Moreover, the period tad of the active damping phase may be adjusted to a specific value that allows to minimize the residual transmit signal at the antenna following a transmission burst.

As mentioned above, the parameters settings for the active damping phase may be configured statically by design. Furthermore, the parameters may be adapted or optimized continuously during the operation of the ALM transceiver by means of a controller that monitors specific system characteristics. For example, an ALM transceiver may obverse the settling of the antenna signal after a transmission burst using its receiver circuit and increase or decrease tad or another parameter to minimize the settling time. Alternatively, an ALM transceiver may evaluate the progression of the phase error of the local clock signal with respect to the reader signal during the resynchronization state following a transmission pulse. Observing the output power of the transmitter during the active damping phase furthermore allows to conclude on the signal conditions at the antenna.

Thus, in accordance with the present disclosure, the antenna signal may be damped following a transmit signal burst to allow a clock synchronization during short modulation pauses. The presently disclosed ALM transceiver is configured to adjust the parameters of the transmit signal at the end of a transmission burst to actively counteract and thus damp the signal at the antenna. The active damping operation allows to improve the power efficiency of the transmitter system. Furthermore, an active damping operation of the kind set forth may significantly reduce the level of voltage peaks at the RX and TX terminals, which may occur upon entering the resynchronization state. These voltage peaks should otherwise be clipped by protective circuit elements at the RX and TX terminals to prevent overvoltage conditions and thus a damage to the transceiver circuit; the voltage clipping however causes a degradation of the desired damping effect towards the antenna signal.

It is noted that the embodiments above have been described with reference to different subject-matters. In particular, some embodiments may have been described with reference to method-type claims whereas other embodiments may have been described with reference to apparatus-type claims. However, a person skilled in the art will gather from the above that, unless otherwise indicated, in addition to any combination of features belonging to one type of subject-matter also any combination of features relating to different subject-matters, in particular a combination of features of the method-type claims and features of the apparatus-type claims, is considered to be disclosed with this document.

Furthermore, it is noted that the drawings are schematic. In different drawings, similar or identical elements are provided with the same reference signs. Furthermore, it is noted that in an effort to provide a concise description of the illustrative embodiments, implementation details which fall into the customary practice of the skilled person may not have been described. It should be appreciated that in the development of any such implementation, as in any engineering or design project, numerous implementation-specific decisions must be made in order to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill.

Finally, it is noted that the skilled person will be able to design many alternative embodiments without departing from the scope of the appended claims. In the claims, any reference sign placed between parentheses shall not be construed as limiting the claim. The word "comprise(s)" or "comprising" does not exclude the presence of elements or steps other than those listed in a claim. The word "a" or "an" preceding an element does not exclude the presence of a plurality of such elements. Measures recited in the claims may be implemented by means of hardware comprising several distinct elements and/or by means of a suitably programmed processor. In a device claim enumerating several means, several of these means may be embodied by one and the same item of hardware. The mere fact that certain measures are recited in mutually different dependent claims does not indicate that a combination of these measures cannot be used to advantage.

LIST OF REFERENCE SIGNS

100 RFID system
102 RFID reader
104 RFID transponder
106 ALM transceiver
108 ALM transceiver
110 transmitter
112 receiver
114 phase locked loop
116 rectifier
118 voltage limiter
120 coupling network
122 antenna coil
124 adjustable resistance
126 adjustable resistance
200 ALM transceiver
202 adjustable resistance
300 ALM transceiver
302 coupling network
400 signal at antenna
402 signal at transmitter output
500 signal at antenna
502 signal at transmitter output
504 control signal for active transmitter state
506 control signal for resynchronization state
600 signal at antenna
602 signal at antenna
700 adjustable transmit signal parameters

The invention claimed is:

1. An active load modulation, ALM, transceiver, comprising a transmitter configured to send a transmit signal to an external device, wherein the transceiver is configured to adjust a plurality of parameters of the transmit signal at a final portion of at least one burst of said transmit signal, wherein adjusting the parameters comprises adjusting both a phase of the transmit signal and adjusting a pulse width of the transmit signal.

2. The transceiver of claim 1, wherein the transceiver is configured to adjust said parameters utilizing preconfigured parameter settings.

3. The transceiver of claim 1, further comprising a controller that is configured to monitor one or more system characteristics and to adjust the parameters in dependence on said system characteristics.

4. The transceiver of claim 3, wherein the system characteristics comprise a settling of the transmit signal on an antenna of the transceiver.

5. The transceiver of claim 3, wherein the system characteristics comprise a phase error of a local clock signal with respect to a signal received from the external device.

6. The transceiver of claim 1, further comprising a receiver and at least one adjustable resistance coupled to a plurality of input or output terminals of the transmitter and to a plurality of input or output terminals of the receiver.

7. The transceiver of claim 6, further comprising a controller configured to adjust said adjustable resistance.

8. The transceiver of claim 7, wherein the adjustable resistance comprises at least one active device, and wherein the controller is configured to adjust the adjustable resistance by applying an analog control signal to said active device.

9. The transceiver of claim 7, wherein the adjustable resistance comprises passive resistance elements, and wherein the controller is configured to adjust the adjustable resistance by digitally switching said passive resistance elements.

10. The transceiver of claim 6, wherein the input or output terminals of the transmitter and the input or output terminals of the receiver are the same terminals.

11. The transceiver of claim 6, wherein the input or output terminals of the transmitter and the input or output terminals of the receiver are separate terminals, and wherein a first adjustable resistance is coupled to the input or output terminals of the transmitter, and a second adjustable resistance is coupled to the input or output terminals of the receiver.

12. The transceiver of claim 1, further comprising a coupling network between the transmitter and an antenna of the transceiver, wherein said coupling network comprises a plurality of capacitors for implementing an impedance optimization between the antenna and input or output terminals of the transmitter.

13. A radio frequency identification, RFID, transponder, comprising the transceiver of claim 1.

14. A method of operating an active load modulation, ALM, transceiver, comprising sending, by a transmitter of the transceiver, a transmit signal to an external device, and adjusting, by the transceiver, a plurality of parameters of the transmit signal at a final portion of at least one burst of said transmit signal, wherein adjusting the parameters comprises adjusting a phase of the transmit signal and adjusting a pulse width of the transmit signal.

* * * * *